Sept. 18, 1945.  F. HOBBS  2,385,205
TENONING MECHANISM
Filed July 3, 1943  3 Sheets-Sheet 1
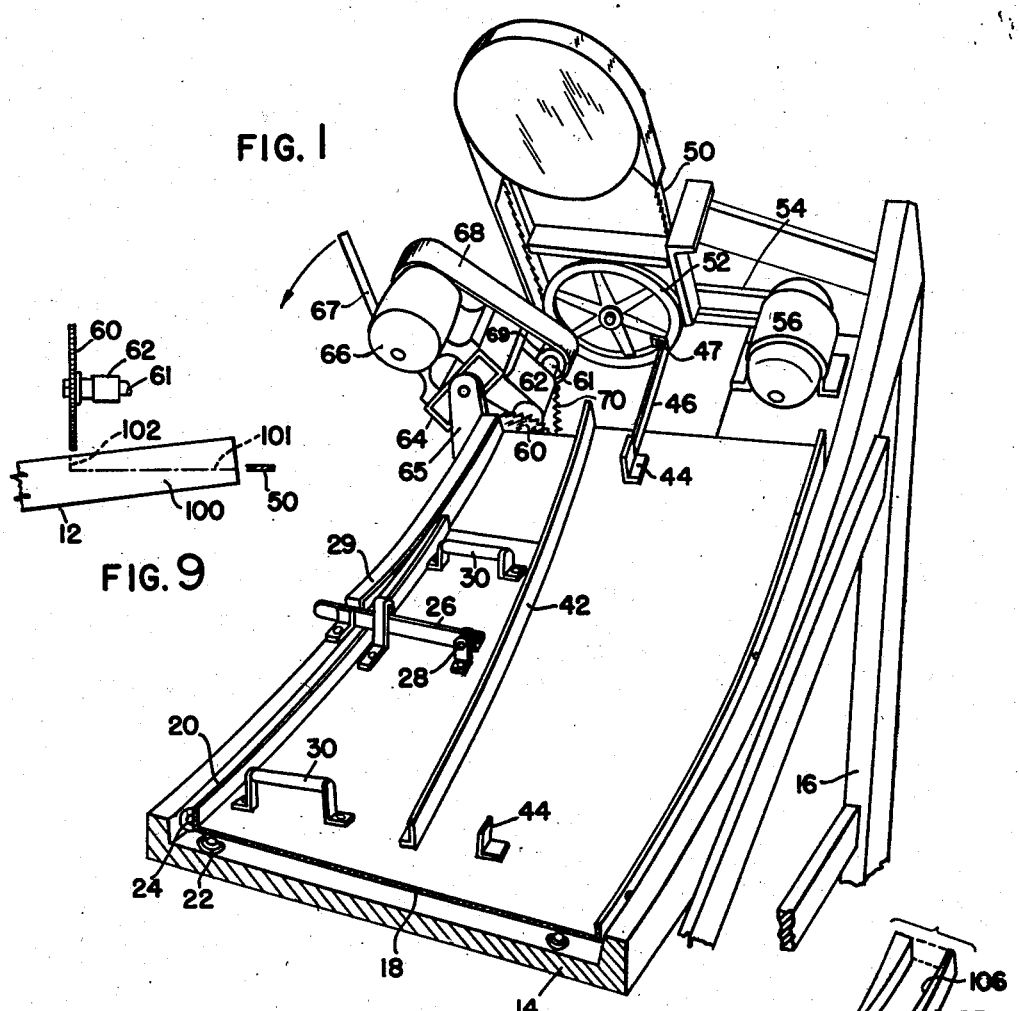
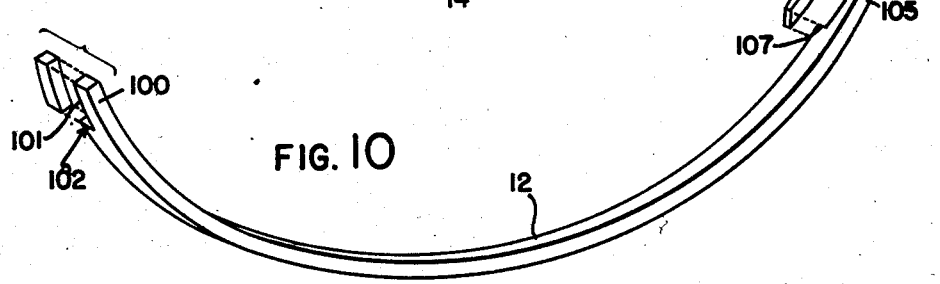
FRANK HOBBS
*INVENTOR*
BY *Smith & Tuck*
*ATTORNEY*

Sept. 18, 1945.　　　　F. HOBBS　　　　2,385,205
TENONING MECHANISM
Filed July 3, 1943　　　3 Sheets-Sheet 2
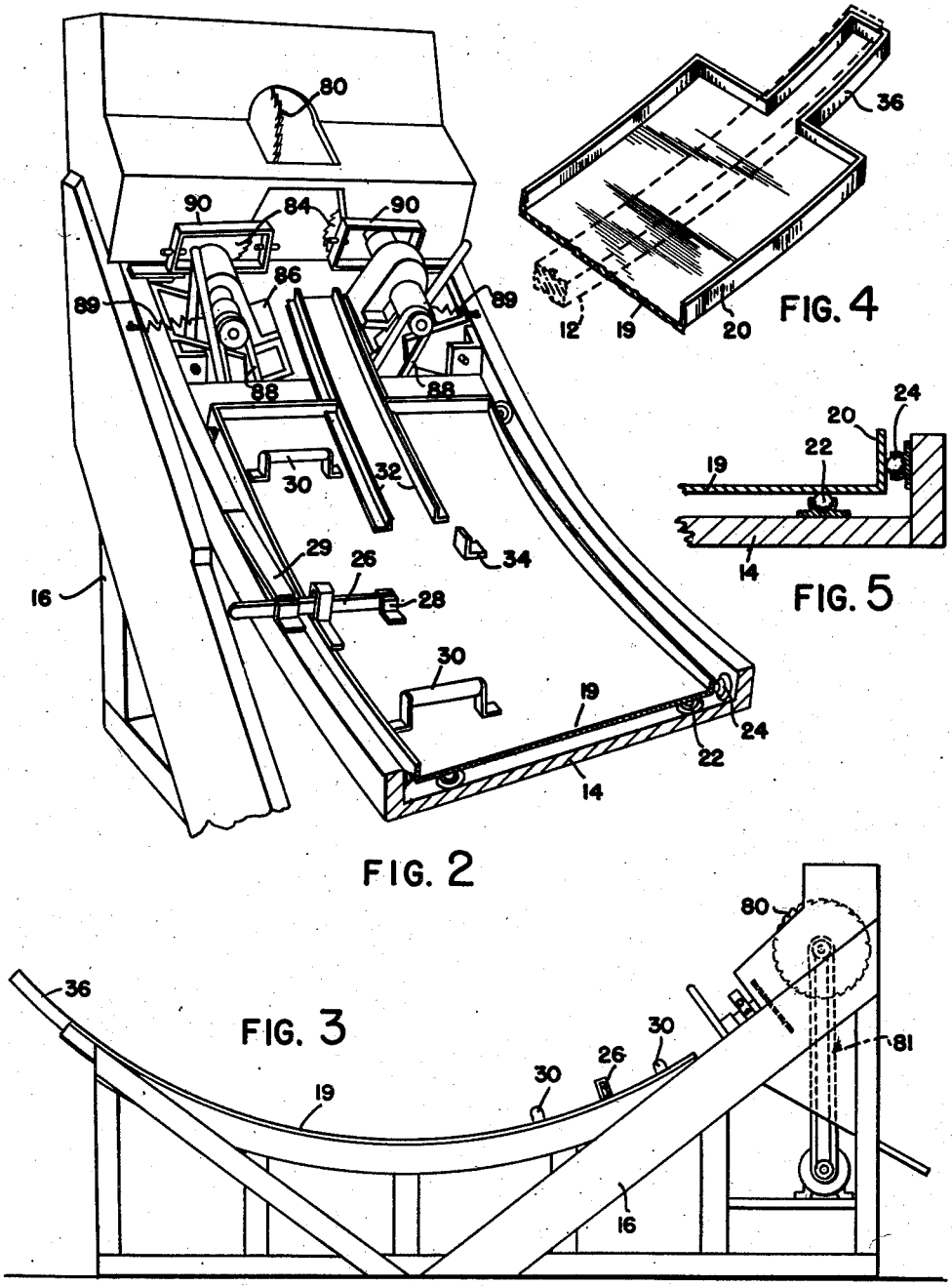
FRANK HOBBS INVENTOR
BY *Smith & Tuck*
ATTORNEY Sept. 18, 1945.  F. HOBBS  2,385,205
TENONING MECHANISM
Filed July 3, 1943  3 Sheets-Sheet 3
FIG. 6
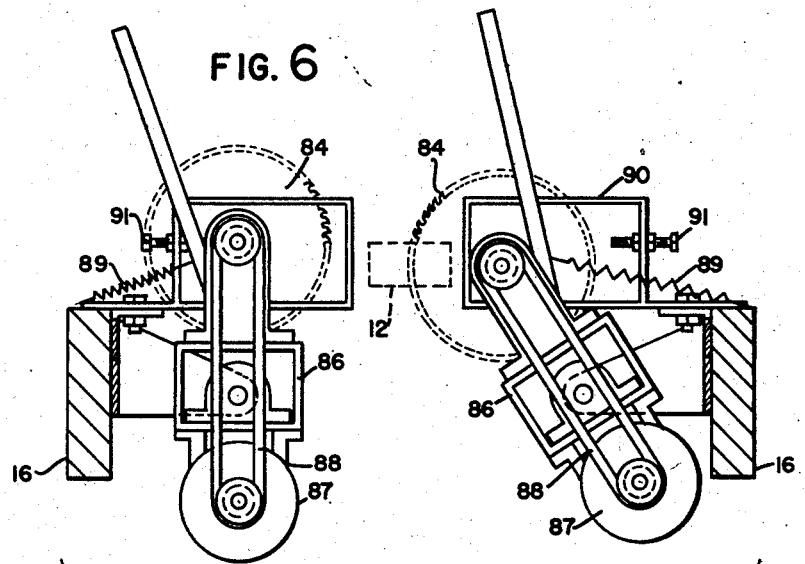
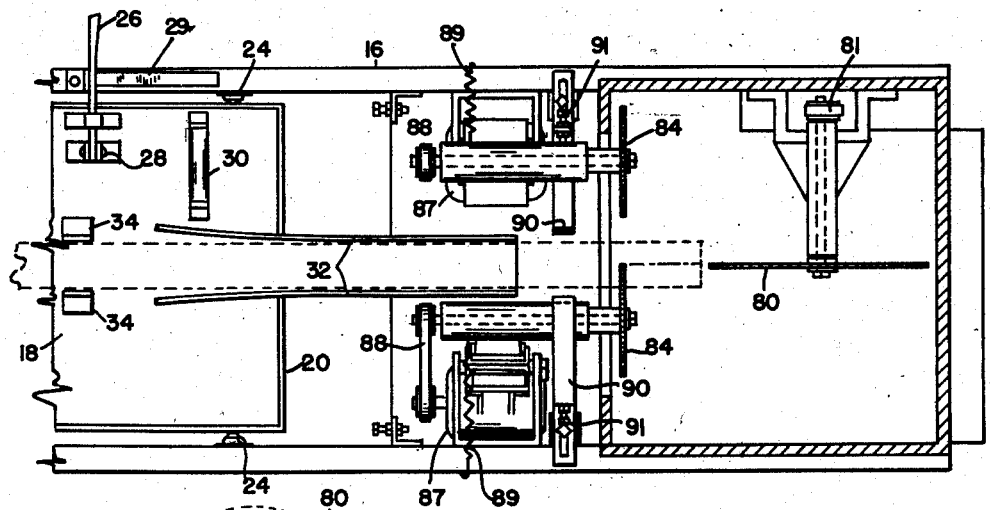
FIG. 7
FIG. 8
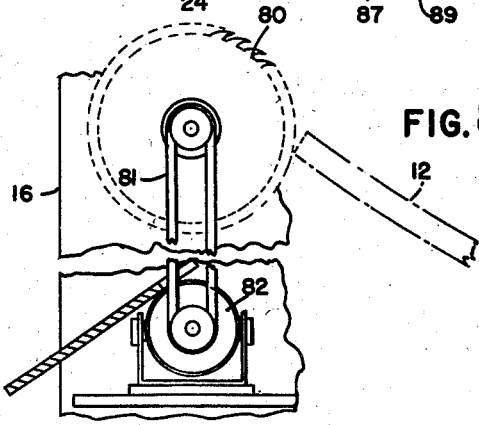
FRANK HOBBS
*INVENTOR*
BY *Smith & Tuck*
*ATTORNEY*

Patented Sept. 18, 1945

2,385,205

UNITED STATES PATENT OFFICE 2,385,205

TENONING MECHANISM

Frank Hobbs, Seattle, Wash.

Application July 3, 1943, Serial No. 493,353

1 Claim. (Cl. 143—52)

This invention relates to improvements in a tenoning mechanism and, more particularly, to machines useful in cutting the ends of wooden members to be joined in notch and tenon joints, step joints and mitered tenon step joints.

There is a real need for a mechanism that will rapidly and accurately cut tenons on the ends of wooden members for subsequent joinder in extension of several of the members in the formation of a member that is longer than any single piece. There is also a great need for a mechanism for the cutting of tenons on curved members whereby accurately shaped tenons will be provided.

There are two general types of mechanism suitable for tenoning wooden members—one relates to that type of equipment wherein the cutter is moved to the work and withdrawn therefrom when cutting operations are completed, and the other relates to the movement of work into the cutter and then the work itself is withdrawn when the operation is completed. This invention relates to both classes or groups of mechanisms, since there is provided a movable carrier upon which the work piece is positioned for carriage into a stationary cutter and as well, in certain instances, the cutter is movable into the work piece.

Among the more serious objections to constructions heretofore used are the complexities involved in the considerable number of parts in most of them; the difficult constructions required in many, the cost of manufacture and maintenance; and the inefficiency in operation.

The main purposes of this invention are to overcome these and many other recognized objections and to provide a simple and efficient, as well as compact and economical construction, which will have the least practical number of working parts for production or maintenance costs, while at the same time adequately at high speed tenoning many work pieces in an average work day.

According to a preferred embodiment of my invention, I mount upon a superstructure a carriage, which is reciprocally movable to present a work piece to a cutter and to withdraw the work piece therefrom. In the forward movement of the carriage, the work piece is split longitudinally by the cutter and at the normal at rest position of the carriage certain lateral cuts are effected in the work piece. More specifically, the carriage is so mounted that it moves in a fixed path, largely under the urgence of the weight of the work piece to advance the carriage. The retraction of the carriage is preferably accomplished manually, although the gravitational effect of the weight of the work piece is also permitted to operate upon the carriage to return it to normal at rest position. The work pieces are mounted upon the carriage in suitable holder clips to properly position it in order that a certain uniform and repetitious type of cut can be effected in forming the tenoning operation. In the specific invention herein illustrated, the carriage is shown as curved since the work piece is a curved rib of substantial length and fairly large in cross section.

The novel features that I consider characteristic of my invention are set forth with particularity in the appended claim. The invention itself, however, both as to its organization and its method of operation, will best be understood from the following description of a specific embodiment when read in connection with the accompanying drawings, in which Figure 1 is a fragmentary view in perspective of the cutting end of one form of my tenoning mechanism;

Figure 2 is a perspective view of the cutting end of an alternative form of the mechanism;

Figure 3 is a side view, in elevation, of my tenoner;

Figure 4 is a fragmentary perspective view of a trailing end of a work piece carriage;

Figure 5 is a fragmentary sectional view, illustrating the anti-friction means used in connection with the movable carriage;

Figure 6 is a detailed elevational view of certain laterally operable cutting mechanisms employed in one form of my tenoner;

Figure 7 is a plan view of the mechanism shown in perspective in Figure 2;

Figure 8 is a detailed elevational view illustrating a longitudinal cutting member;

Figure 9 is a detailed view illustrating the manner of tenoning performed in my mechanism; and Figure 10 is a fragmentary view of a work piece illustrating the portions removed in the tenoning operation and shown as though exploded with respect to the parent work piece.

The numeral 12 designates a work piece of rectangular cross section and substantial length, as shown in Figure 10. In the specific instance illustrated, the work piece is a curved rib suitable for use in certain types of housing construction which, in such use, it is desired to join and anchor tenons at either end. Since it is preferable that the tenons formed on the work piece at either end be slightly different, I have illustrated to the left in Figure 10 tenon 100 usually provided for the anchored end of the rib and to the right in the view tenon 105 used in the formation of a mitered-tenon stepped joint. In the first instance, the longitudinally cut edge 101 is taken medially of the rib, whereas in the latter instance the longitudinally directed cut edge 105 is at an angle to the median. In both instances the lateral cuts 102, 107 are substantially at right angles to the longitudinal axis of the rib.

The tenoning machine of Figure 1 is specifically adapted to perform the cut of providing the tapered tenon 105 shown to the right in Figure 10, and the tenoning mechanism of Figures 2 and 3, and 6 and 7 is specifically adapted to tenon the work piece as appears at 100 in Figure 10.

Fundamentally, the two mechanisms of the figures are substantially the same, differing only in detail as to the specific arrangement of the cutting mechanism and as to the manner in which the work piece is positioned upon the movable carriage.

In each instance there is a space or bed 14 which is suitably supported on structural members 16. In this particular case, each of the beds is curved to conform to the contour of the arcuate rib 12 upon which work is to be performed. In each of the two types of machine there is a reciprocally movable carriage of arcuate shape to conform to the contour of the bed as well as to the rib to accommodate the latter. Both have similar characteristics, each comprising a pan 18 or 19 having peripheral walls 20. The pan is supported in spaced apart relation from the bed 14 by means of anti-friction rollers 22 and 24, the former supporting the bottom of the pan and the latter acting on the outer faces of the surrounding wall of the pan. Each carriage has a latch member 26 pivoted at 28 to engage in a groove in a latch keeper member 29 for positioning the carriage during normal at rest periods. Hand grips are indicated at 30 to facilitate the manual movement of the carriage on occasion.

Referring specifically to the apparatus shown in Figure 2, at its forward end the carriage 19 has a pair of spaced apart guide members 32 between which an end of the rib 12 is placed. At various positions along the length of the carriage retainer and guide clips 34 are also used. The trailing end of the carriage has a U-shaped enclosure 36 (Figure 4) for the end of the rib not to be cut on this particular machine, so that the work piece end is enclosed and registered.

Turning now to the mechanism shown in Figure 1, a guide rail 42 is indicated, across from which are spaced apart guide clips 44, 44. The carriage 18 has an extension member 46 against the flanged end 47 of which the end of the rib to be cut on this particular mechanism is placed to keep the same in proper position during the cutting operation.

Since it is customary to form the tenon 105, shown on the right end of the rib 12 of Figure 10, on the machine of Figure 1, I shall describe that operation first and the mechanism whereby that cut is provided. It will be noted primarily that the guide rail 42 and the opposed guide clip 44 are disposed on the carriage 18 at an angle thereto. Thus, when a rib is placed upon the carriage between these guide members it also will be disposed at an angle thereto. In forward movement, the rib end will be presented to the saw blade 50 in such a manner that the saw will take a cut 106 at an angle to the longitudinal axis of the rib. The saw blade 50 is of conventional bandsaw type, passing over sheaves 52 that are powered through the belt 54 from the motor 56. When the work piece is placed upon the carriage and the carriage unlatched, the rib end is advanced forward into the saw and then withdrawn, thus forming a saw kerf in the end of the work piece with a portion yet to be removed.

When the carriage returns to the normal at rest position, the waste portion is still to be removed. This operation is performed by means of the rotary saw 60 mounted upon an arbor 61 journaled in the bearing housing 62 which is secured upon the pivoted base 64 supported by the arm 65. To the opposite side of the base is the motor 66 having a manually gripped handle 67 secured thereto. The motor, through the instrumentality of the belt 68, drives a pulley 69 on the arbor 61 to rotate the saw 60. A return spring for this mechanism is indicated at 70. With the work piece in the at rest position, the operator draws the swing saw 60 about its axis by means of the handle 67 in the direction indicated by the arrow in the figure to raise the saw whereby the lateral cut 107 is made and the waste piece falls through below the saw end and out of the machine. These cutting operations are performed rapidly in sequence whereupon the work piece is transferred to another machine for further machining.

The operation of the mechanism shown in Figure 2 is, in many respects, similar to that of the other machine. The work piece is placed upon the table 19 but, in this instance, it is aligned with the longitudinal axis of the carriage 18 and is advanced forwardly parallel to its median into the rotary saw 80. Saw 80 is caused to turn through the instrumentality of belt 81 that derives power from the motor 82 therebelow. See Figures 3 and 8. As the work piece is advanced into the saw 80 a cut 101 aligned with the longitudinal axis of the rib is made. The work piece is then withdrawn from the saw 80 and the carriage returns to the normal at rest position. In certain cases, the lateral cut 102 taken on this particular end of the work piece is from the right and in other instances it is from the left. Thus, there are provided with two cut-off saws 84, 84, each similar in every respect to the cut-off saw of Figure 1, since each device is mounted upon a swinging base 86 having on the opposite side a motor 87 and the usual connecting drive belt 88. See Figures 6 and 7. Return spring 89 is indicated. The arbor is surrounded by a limiting keeper 90 having an adjustable stop 91 all of which governs the degree the saw cuts into the work piece.

It will be recognized that the antifriction members 22 and 24 defined a curved path in which the carriage is moved. Since the carriage is under the effect of gravity, it naturally seeks a low point at which to come to rest, and on both sides of which it is movable. The latching mechanism 26, 29 is so positioned with relation to the base 16 that when the latch 26 is engaged by the keeper 29 the carriage is maintained with its greatest portion and weight to one side of the low point; to that side away from the cutting mechanism comprising the saws 80 or 84.

When a work piece is disposed upon the carriage, either 18 or 19, its weight is added to that of carriage which is to one side of the low point.

With the latch released the carriage will tend to seek the lowest point, but due to the arrangement of the workpiece positioning members on the carriage, the end of the workpiece which is to be worked is brought into contact or working position with the cutting members. In other words, it is necessary that the carriage be advanced past that low point to introduce the workpiece to the saw 80 for the longitudinal cutting action and this is done by the loaded movement of the carriage. Thus it can be seen that when the workpiece is properly positioned and the carriage released, the operator is largely relieved of the necessity of overcoming the weight of the carriage and the workpiece to start the same into motion, since gravity takes effect immediately upon the carriage and it is started in a curved path to bring that end of the workpiece to be cut by the saw 80 into a proper position. The saw operates at high speed and the cut is quickly effected while the workpiece is in forward motion. The carriage abuts a suitable stop mechanism, at which point its greatest weight is to the saw side of the low point mentioned above and the direction of travel of the carriage is reversed to bring it back to the latching position. Again the action of gravity takes effect and aids the operator by relieving him of having to impart power to cause this reverse travel of the carriage. The action is comparable to that of a pendulum, except for the intermittency required by the period necessitated in changing the workpieces by removing one from the table and replacing it by another member to be worked.

I claim:

A woodworking mechanism, comprising: a fixed base having guideways thereon defining an upwardly concaved path; a wide carriage bed conforming to said path, movable in, and carried by said guideways, and having means to receive and position a workpiece thereon, said carriage when loaded or unloaded with a workpiece and when having free movement along said guideways, tending under gravitational forces to reach a position of rest at the lowest point along the path of said guideways; a latch means between said carriage and said base to retain the carriage and a workpiece when positioned thereon, in a position to one side of the low point of their travel; and means to the opposite side of said lowest point from said latching position and in the path of the workpiece to cut the workpiece in a predetermined manner when said piece is to said opposite side.

FRANK HOBBS.